(12) United States Patent
Tavares et al.

(10) Patent No.: US 9,476,475 B2
(45) Date of Patent: *Oct. 25, 2016

(54) POLYMER SPRING

(71) Applicant: Pennsy Corporation, West Chester, PA (US)

(72) Inventors: Manuel Tavares, Doylestown, PA (US); Michael J. Schmidt, Norristown, PA (US)

(73) Assignee: PENNSY CORPORATION, West Chester, PA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/081,354

(22) Filed: Nov. 15, 2013

(65) Prior Publication Data

US 2014/0217662 A1 Aug. 7, 2014

Related U.S. Application Data

(62) Division of application No. 12/925,462, filed on Oct. 21, 2010, now Pat. No. 8,590,869.

(60) Provisional application No. 61/279,635, filed on Oct. 23, 2009.

(51) Int. Cl.
*F16F 1/36* (2006.01)
*F16F 1/373* (2006.01)

(52) U.S. Cl.
CPC ........... *F16F 1/3732* (2013.01); *F16F 1/3605* (2013.01)

(58) Field of Classification Search
CPC ........ F16F 1/3732; F16F 1/3605; F16F 1/36; B60G 11/22

USPC ........................ 267/153, 152, 35, 292, 141.1
See application file for complete search history.

(56) References Cited

U.S. PATENT DOCUMENTS

| | | | |
|---|---|---|---|
| 3,402,924 A | 9/1968 | Rix | |
| 3,409,284 A * | 11/1968 | Rix | F16F 1/3732 267/153 |
| 4,053,148 A * | 10/1977 | Chalmers | B60G 11/22 267/153 |
| 4,566,678 A * | 1/1986 | Anderson | B29C 67/0014 264/249 |
| 5,868,384 A * | 2/1999 | Anderson | F16F 1/3732 267/140 |
| 6,220,585 B1 * | 4/2001 | Heron | F16F 1/3732 267/152 |
| 7,458,172 B2 * | 12/2008 | Aveni | A43B 13/183 267/144 |
| 8,590,869 B2 * | 11/2013 | Tavares | F16F 1/3732 267/152 |

* cited by examiner

*Primary Examiner* — Pamela Rodriguez
(74) *Attorney, Agent, or Firm* — John F. A. Earley, III; Frank J. Bonini, Jr.; Harding, Earley, Follmer & Frailey, P.C.

(57) ABSTRACT

A polymer spring has a hollow tubular polymer body, wherein the first end portion of the body, the second end portion of the body, and the mid-portion of the body together substantially maintain an annular cylindrical column structure throughout the length of the body from the first end portion of the body to the second end portion of the body, such that the mid-portion of the body has a substantial portion that is in direct alignment with the first end portion of the body and the second end portion of the body when the spring is compressed to eliminate or reduce the chances of the spring failing caused by the spring folding or buckling and to reduce material fatigue in the polymer spring associated with folding or buckling.

20 Claims, 23 Drawing Sheets

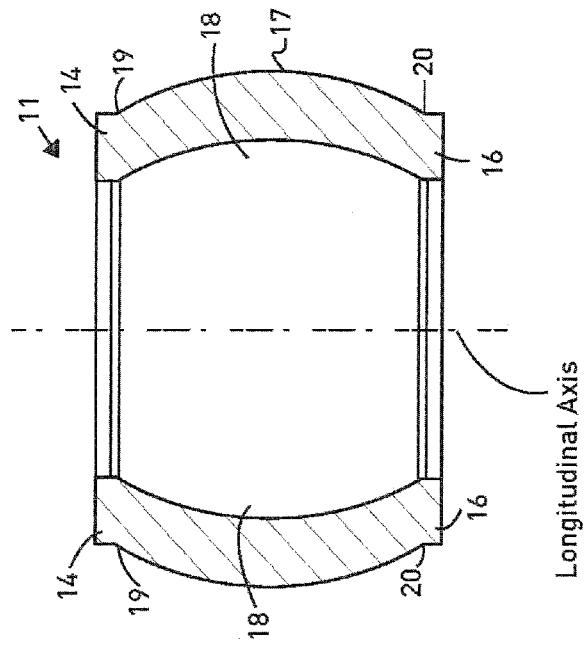
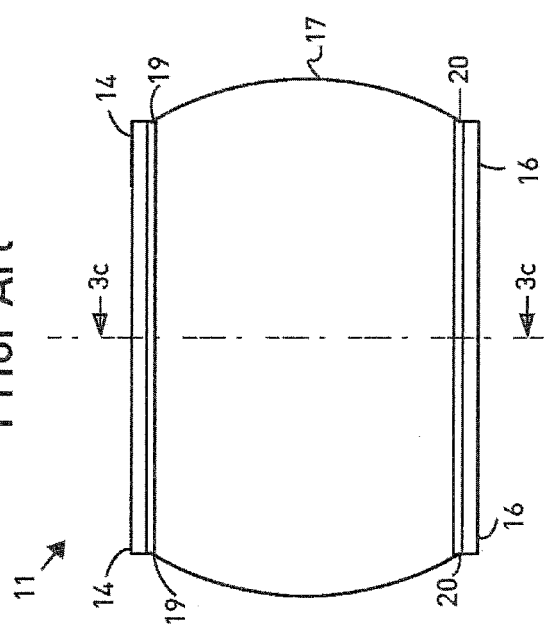
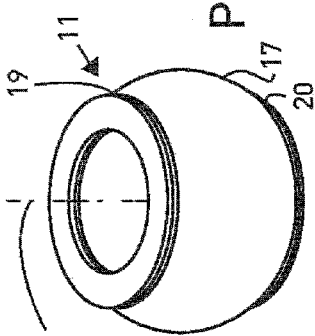

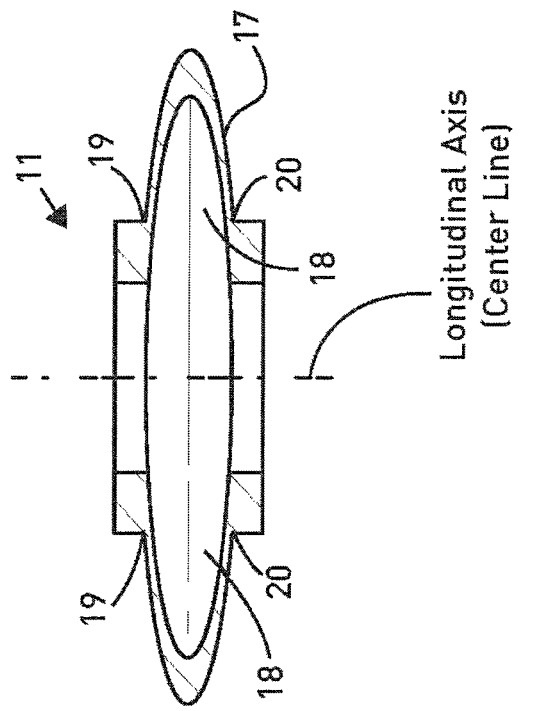
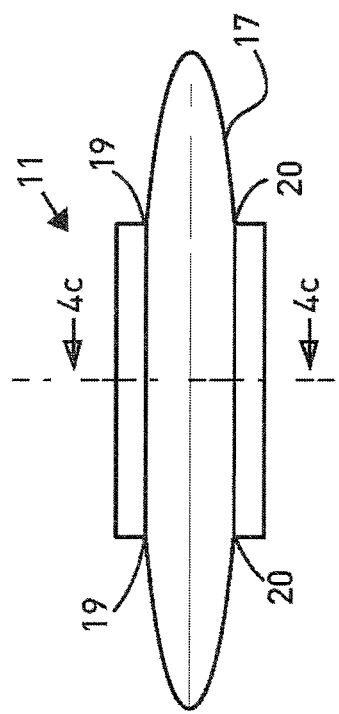
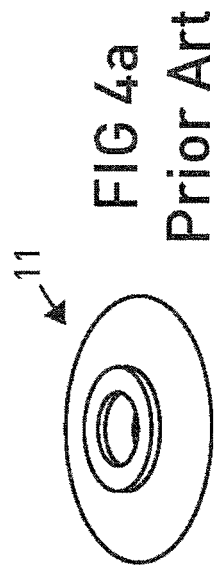

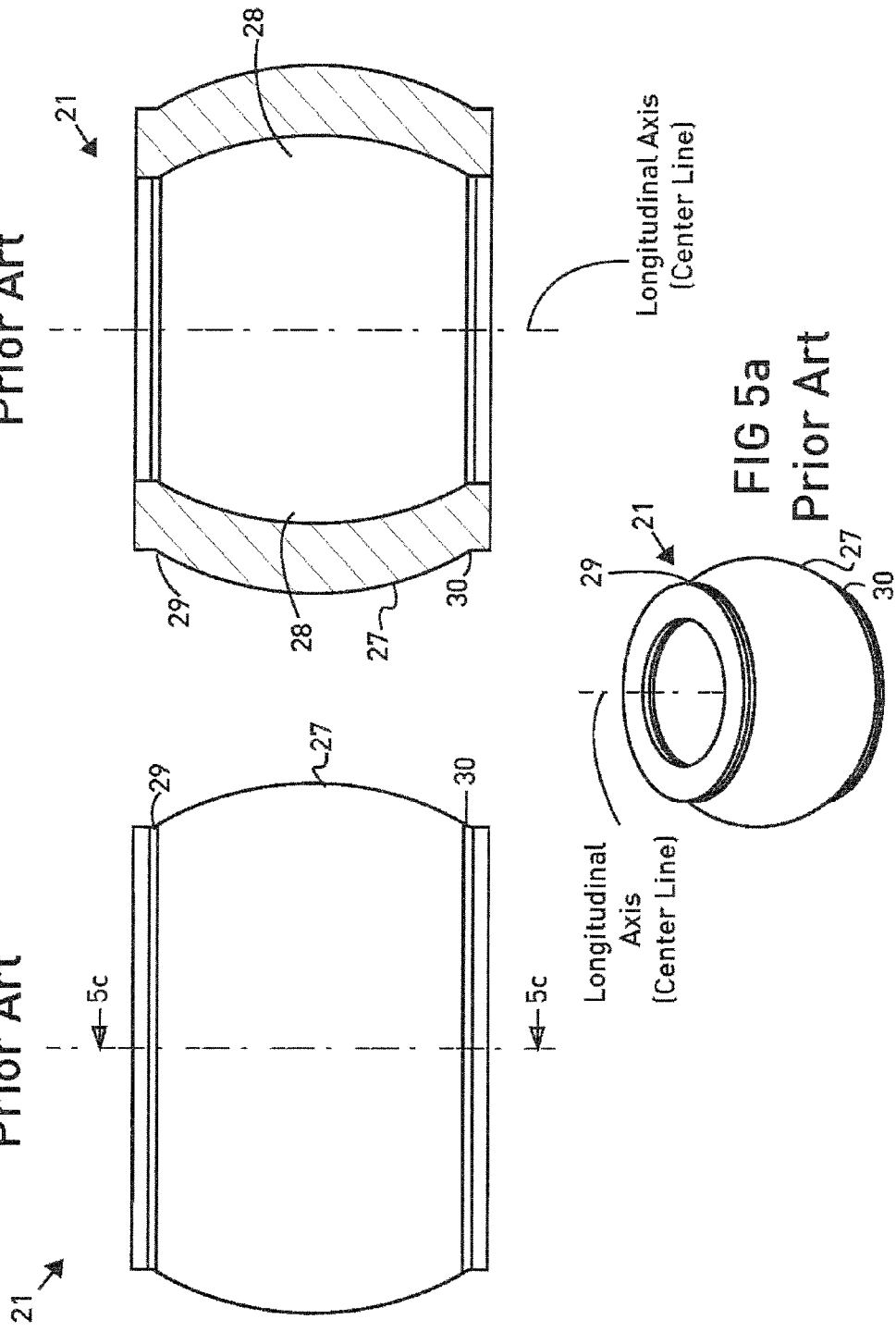

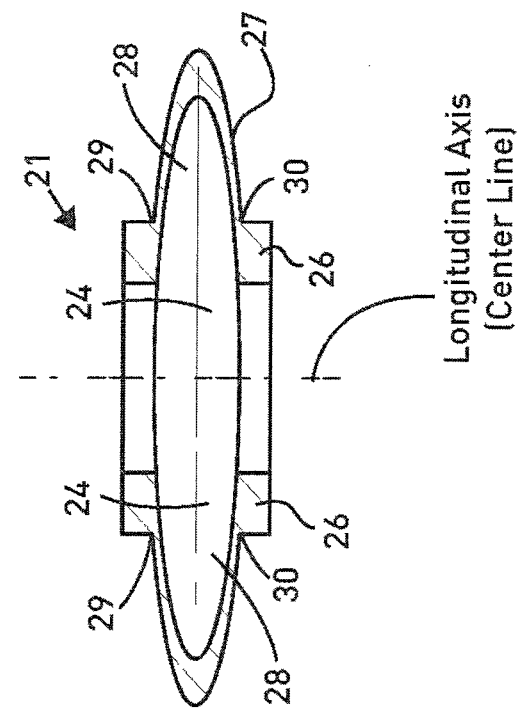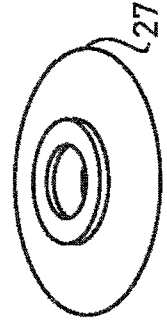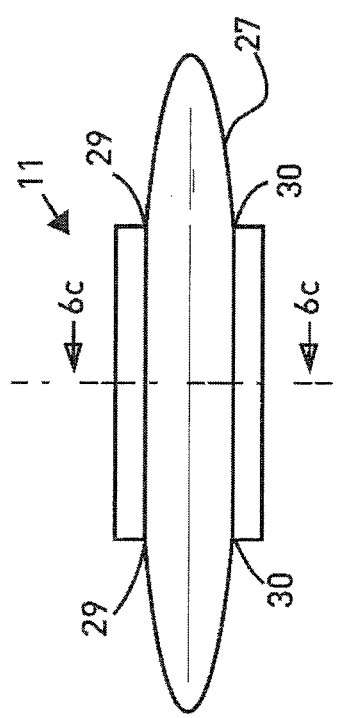

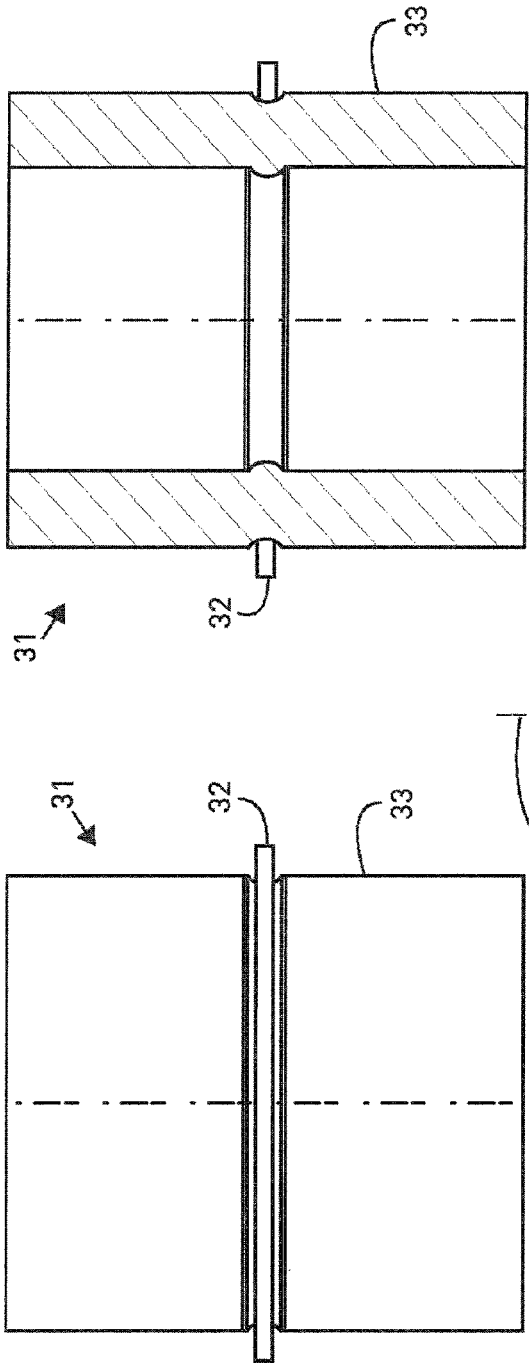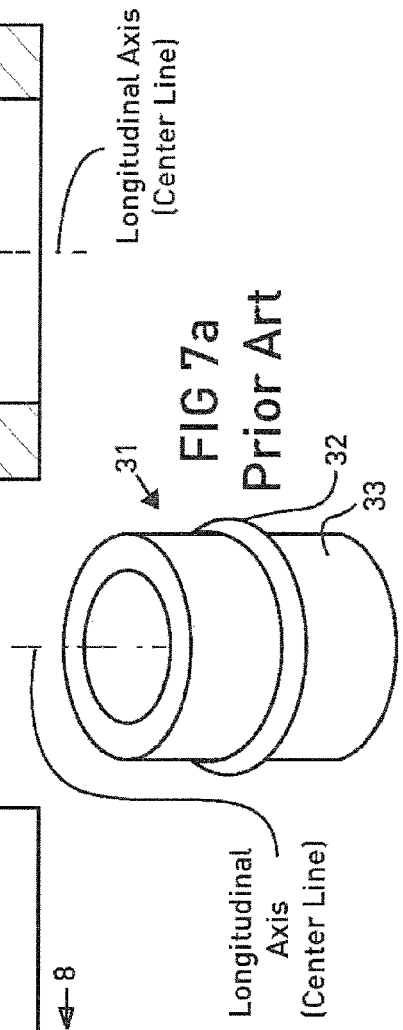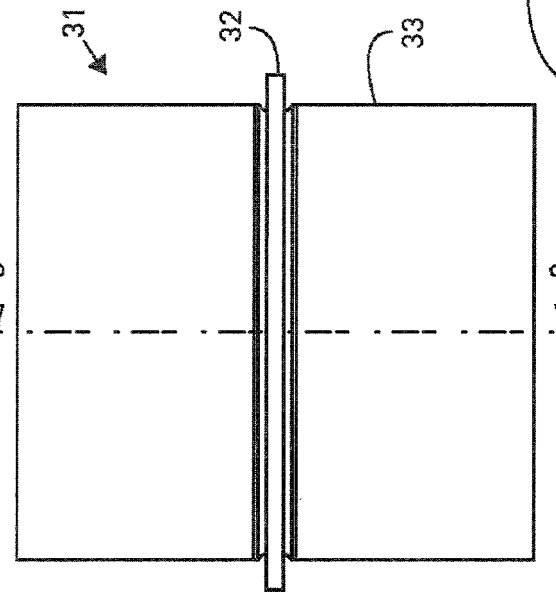

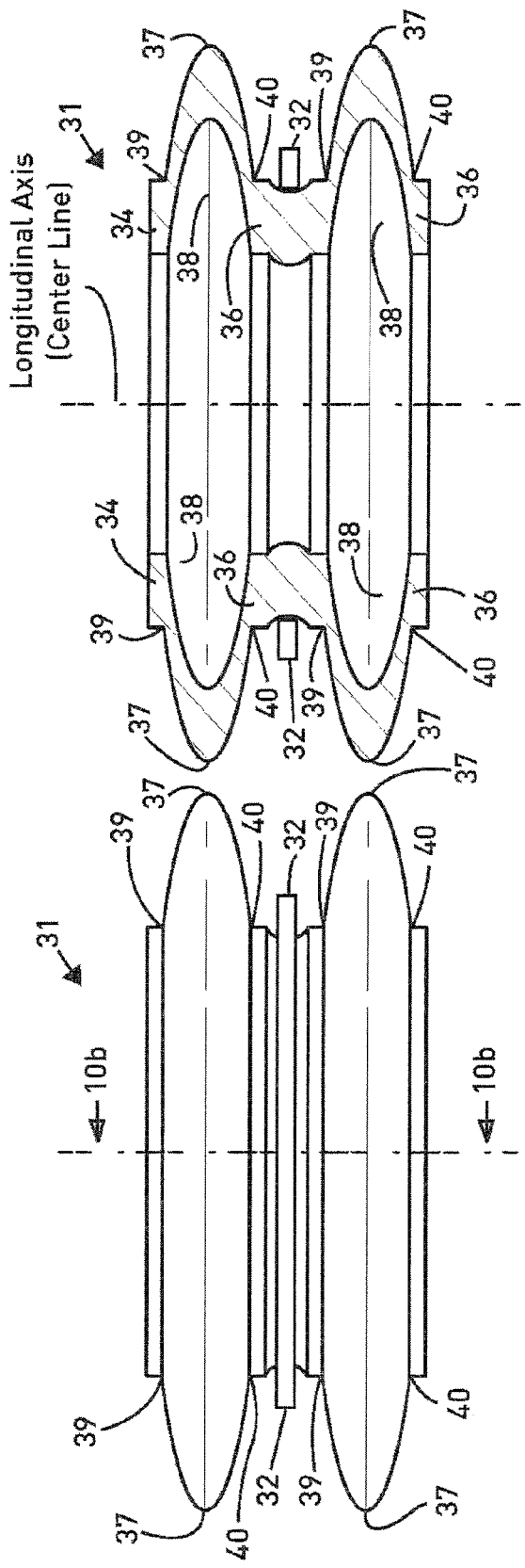

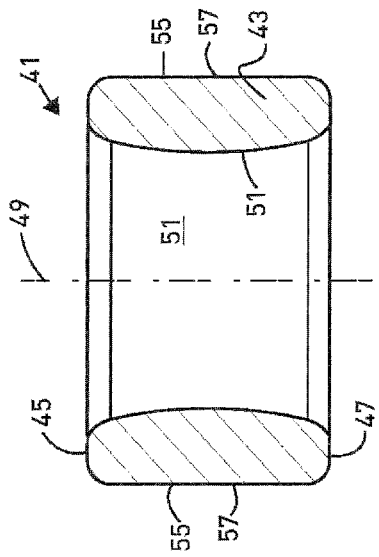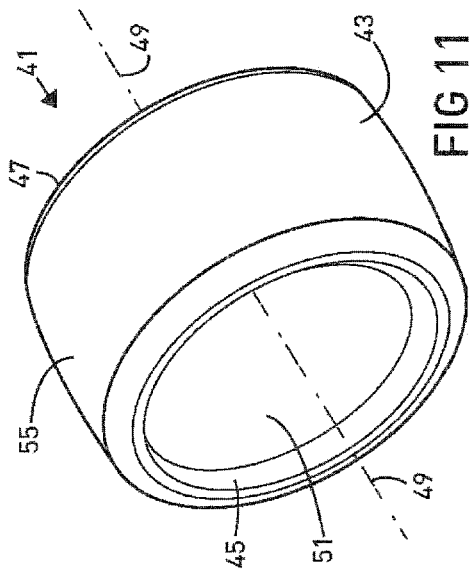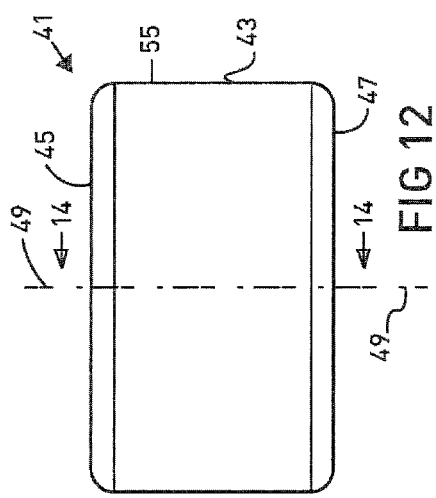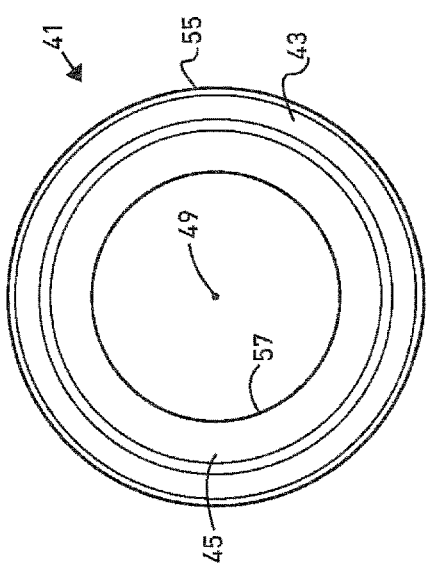

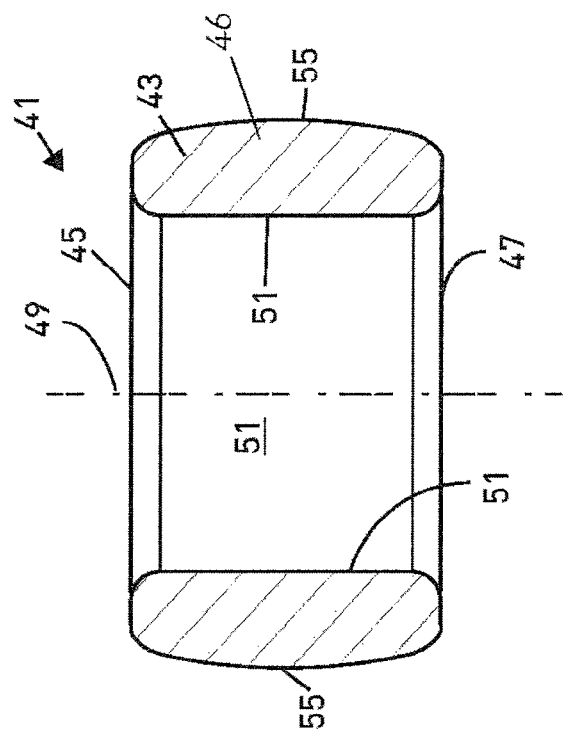
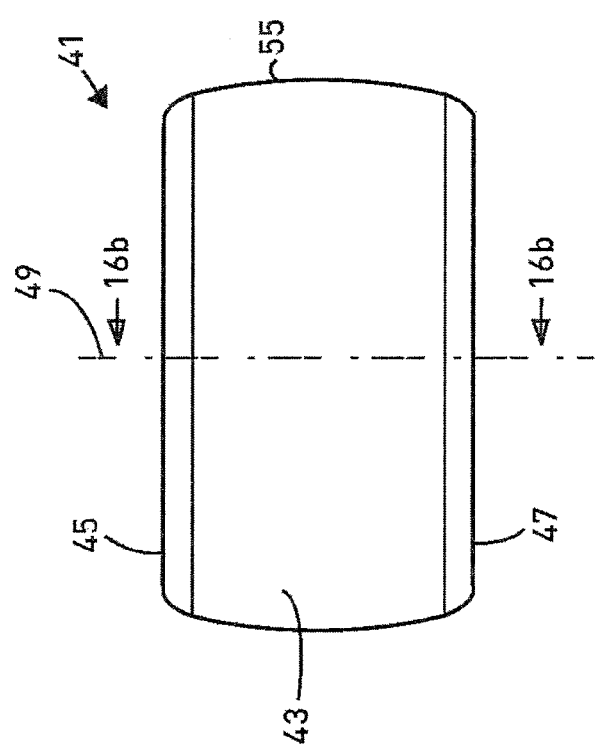

POLYMER SPRING

CROSS REFERENCE TO RELATED APPLICATIONS

The benefits under 35 U.S.C. §§119(e), 120, 121 of the following are hereby claimed: U.S. application Ser. No. 12/925,462, filed on Oct. 21, 2010, now U.S. Pat. No. 8,590,869, U.S. Provisional Application Ser. No. 61/279,635, filed on Oct. 23, 2009, the complete contents of which are incorporated herein by reference.

BACKGROUND OF THE INVENTION

1. Field of the Invention

This invention relates to springs, and more particularly concerns polymer springs.

2. Description of the Prior Art

Polymer springs are used for a wide variety of applications. For instance, applications vary from use with diving boards to uses in truck mounts, shock absorbers, and railroad car cushioning units.

One type of polymer spring is the straight cylinder polymer spring 11, which, as shown in FIGS. 1 and 2, has a cylindrical body 13 having a cylindrical axial bore 15 extending through it. Upon application of sufficient compressive force on this type of spring 11, the central portion 17 of the spring 11 bulges outwardly, as shown in FIGS. 3a, 3b, and 3c, creating stress points in the spring 11 at its bulged portion, which may lead to failure of the spring 11 due to the spring ripping or tearing typically somewhere at or near the portion of the spring 11 that has bulged outwardly the most. Further, upon application of sufficient compressive force on the spring 11, in addition to the stress on the central portion 17 of the spring 11 when the central portion 17 of the spring 11 bulges outwardly, additional stress areas on the spring 11 are created, as shown by reference number 19 and 20 shown in FIGS. 3a to 3c, where the bulged central portion 17 of the spring 11 meets the remainder of the spring 11 above and below the bulged central portion 17. Too much stress at these high stress areas 19 and 20 may cause the spring 11 to fail due to the spring tearing or ripping at these high stress areas 19 and 20. Moreover, the spring 11 may fail if the force on the spring 11 causes the spring 11 to buckle or fold, as illustrated in FIGS. 4a to 4c, when the central portion 17 of the spring 11 has bulged outwardly. Additionally, once the spring folds or buckles, its spring load capacity is permanently reduced due to permanent loss in the height of the spring due to material fatigue at the buckling or folding point.

Another type of polymer spring is the pre-bulged spring 21, shown in FIGS. 5a to 5c, which is formed such that in a non-compressed state (that is, prior to force being applied to the spring 21 when the spring 21 is in use), the central portion 27 of the spring 21 already is bulged outwardly. Like the straight cylindrical spring 11 shown in FIGS. 1 and 2, upon application of sufficient force on the pre-bulged spring 21, high stress areas 29 and 30 are formed on the pre-bulged spring 21 where the bulged central portion 27 of the pre-bulged spring 21 meets the remainder of the pre-bulged spring 21 above and below its bulged portion 27, which may lead to the pre-bulged spring 21 tearing or ripping at these high stress areas 29 and 30 if too much stress is incurred. Further, the pre-bulged spring 21 may fail if the force on the pre-bulged spring 21 causes the spring 21 to buckle on fold at its central portion 27, as illustrated in FIGS. 6a to 6c. Additionally, once the spring folds or buckles, its spring load capacity is permanently reduced due to permanent loss in the height of the spring due to material fatigue at the buckling or folding point.

Another type of polymer spring is the constrained spring 31, such as that shown in FIGS. 7a, 7b and 8, which is similar to the straight cylinder spring 11, except it is provided with a washer 32 around its periphery. Upon application of sufficient compressive force on this type of spring 31, outward bulging of the spring 31 occurs above and below the washer 32, as illustrated in FIGS. 9a and 9b, creating stress points in the spring 31 at its bulged portions 37, which may lead to failure of the spring 31 due to the spring 31 ripping or tearing typically somewhere at or near the portions of the spring 31 that have bulged outwardly the most. Further, upon application of sufficient compressive force on the spring 31, in addition to stress on the bulged portions 37, additional stress areas on the spring 31 are created, as shown by reference numbers 39 and 40, in the body 33 of the spring 31 at each end of the bulged portions 37, as well as in the body 33 of the spring 31 at the washer 32. Too much stress at these stress areas, including high stress areas 39 and 40, may cause the spring 31 to fail due to the spring 31 tearing or ripping at these high stress areas. Moreover, the spring 31 may fail if the force on the spring 31 causes the spring 31 to buckle or fold, as illustrated in FIGS. 10a and 10b, in the bulged portions 37. Additionally, once the spring folds or buckles, its spring load capacity is permanently reduced due to permanent loss in the height of the spring due to material fatigue at the buckling or folding point.

SUMMARY OF THE INVENTION

It is an object of the invention to provide a polymer spring that eliminates or reduces the chances of the spring failing caused by the spring folding or buckling.

It is another object of the invention to reduce material fatigue in polymer springs associated with folding or buckling.

These and other objects of the invention are provided by the invention which is described below.

BRIEF DESCRIPTION OF THE DRAWINGS

FIG. 3a is a view in perspective of the cylinder polymer spring 11 of FIG. 1 after the central portion 17 of the spring 11 has bulged outwardly upon application of sufficient force on the spring 11;

FIG. 3b is a view in front elevation of the cylinder polymer spring 11 of FIG. 1 after the central portion 17 of the spring 11 has bulged outwardly upon application of sufficient force on the spring 11;

FIG. 3c is a view in cross-section of the cylinder polymer spring 11 of FIG. 1 after the central portion 17 of the spring 11 has bulged outwardly upon application of sufficient force on the spring 11;

FIG. 4a is a view in perspective of the cylinder polymer spring 11 of FIG. 1 after the spring 11 has failed due to buckling or folding of the spring 11 at its central portion 17 upon application of sufficient force on the spring 11;

FIG. 4b is a view in front elevation of the cylinder polymer spring 11 of FIG. 1 after the spring 11 has failed due to buckling or folding of the spring 11 at its central portion 17 upon application of sufficient force on the spring 11;

FIG. 4c is a view in cross-section of the cylinder polymer spring 11 of FIG. 1 after the spring 11 has failed due to buckling or folding of the spring 11 at its central portion 17 upon application of sufficient force on the spring 11;

FIG. 5a is a view in perspective of a prior art pre-bulged polymer spring 21;

FIG. 5b is a view in front elevation of the pre-bulged polymer spring 21 of FIG. 5a;

FIG. 5c is a view in cross-section of the pre-bulged polymer spring 21 of FIGS. 5a and 5b;

FIG. 6a is a view in perspective of the pre-bulged polymer spring 21 of FIG. 5 after the spring 21 has failed due to buckling or folding of the spring 21 at its central portion 27 upon application of sufficient force on the spring 21;

FIG. 6b is a view in front elevation of the pre-bulged polymer spring 21 of FIG. 5 after the spring 21 has failed due to buckling or folding of the spring 21 at its central portion 27 upon application of sufficient force on the spring 21;

FIG. 6c is a view in cross-section of the pre-bulged polymer spring 21 of FIG. 5 after the spring 21 has failed due to buckling or folding of the spring 21 at its central portion 27 upon application of sufficient force on the spring 21;

FIG. 7a is a view in perspective of a prior art constrained polymer spring 31;

FIG. 7b is a view in front elevation of the constrained polymer spring 31 of FIG. 7a;

FIG. 8 is a view in cross-section of the constrained polymer spring 31 of FIGS. 7a and 7b in an unloaded condition;

FIG. 10a is a view in front elevation of the constrained polymer spring 31 of FIGS. 7a, 7b, and 8 after the spring has failed due to buckling or folding of the spring 31 at its central portions 37 upon application of sufficient force on the spring 31;

FIG. 10b is a view in cross-section of the constrained polymer spring 31 of FIGS. 7a, 7b, and 8 after the spring has failed due to buckling or folding of the spring 31 at its central portions 37 upon application of sufficient force on the spring 31;

FIG. 11 is a view in perspective of a polymer spring 41 constructed in accordance with the invention;

FIG. 12 is a view in front elevation of the inventive polymer spring 41 of FIG. 11;

FIG. 13 is a top plan view of the inventive polymer spring 41 of FIG. 11;

FIG. 14 is a view in cross-section of the inventive polymer spring 41 of FIG. 11 in an unloaded condition;

FIG. 16a is a view in front elevation of another preferred embodiment of the inventive polymer spring 41 shown in an unloaded condition;

FIG. 16b is a view in cross-section of the inventive polymer spring 41 of FIG. 16 shown in an unloaded condition;

DETAILED DESCRIPTION

Figure 2:
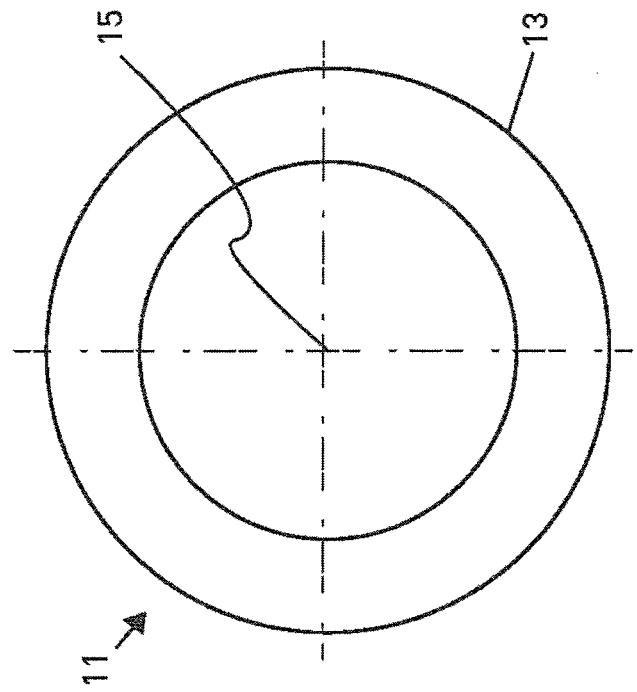
FIG. 2 is a top plan view of the straight cylinder polymer spring 11 shown in FIG. 1.
Figure 1:
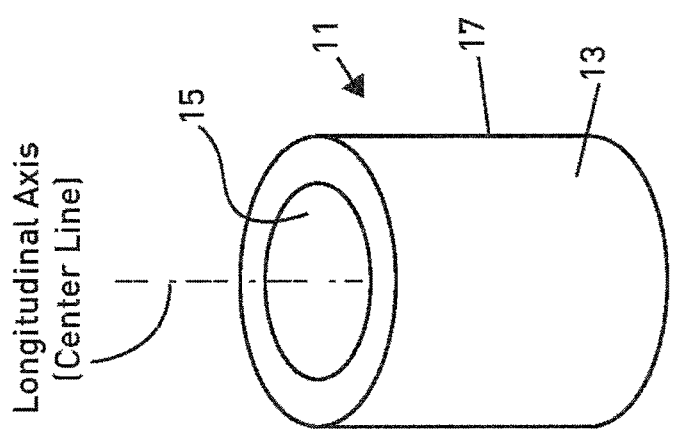
FIG. 1 is a perspective view of a prior art straight cylinder polymer spring 11.

Turning to the drawings, there is shown in FIGS. 11 to 19b various preferred embodiments of the inventive polymer spring 41.

The polymer spring 41 has a hollow tubular polymer body 43. The body 43 has a first end portion 45, a second end portion 47, and a center axis 49 extending between the first end portion 45 of the body 43 and the second end portion 47 of the body 43. The body 43 also has a mid-portion 46 that connects the first end portion 45 of the body 43 to the second end portion 47 of the body 43.

The body 43 has an inner surface 51 extending around and facing the center axis 49 between the first end portion 45 of the body 43 and the second end portion 47 of the body 43, and preferably, the inner surface 51 of the body 43 of the spring 41 between the first end portion 45 of the body 43 and the second end portion 47 of the body 43 is bowed at least slightly inwardly toward the center axis 49 when the spring 41 is in a non-compressed state (e.g., prior to force being applied to the spring 41 during use of the spring 41). The body 43 also has an outer surface 55 extending around the center axis 49 between the first end portion 45 of the body 43 and the second end portion 47 of the body 43, and preferably, the outer surface 55 of the body 43 of the spring 41 between the first end portion 45 of the body 43 and the second end portion 47 of the body 43 is bowed at least slightly outwardly away from the center axis 49 when the spring 41 is in a non-compressed state (e.g., prior to force being applied to the spring 41 during use of the spring 41).

As force is applied to the spring 41 during use of the spring 41, the first end portion 45 of the body 43, the second end portion 47 of the body 43, and the mid-portion 46 of the body 43 together substantially maintain an annular cylindrical column structure throughout the axial length of the body 43 (e.g., the length of the body 43 from the first end portion 45 to the second end portion 47), such that the mid-portion 46 of the body 43 has a substantial portion 46a that is in direct alignment with the first end portion 45 of the body 43 and the second end portion of the body 43 when the spring 41 is compressed until at least a predetermined maximum compression designed for a predetermined use of the spring 41 is reached.

Preferably, the spring 41 is comprised of a resilient or elastic material. Preferably, the spring 41 is comprised of a polymer. Preferably, the spring 41 is comprised of elastomeric materials. Preferably, the spring 41 is comprised of materials such as rubber, urethanes, epoxies, silicones, nylon, co-polyester elastomers, PEEK, thermoplastic elastomers, or the like, and, preferably, the spring 41 may be manufactured by casting it, injection molding it, extruding it, or cutting it out of a block of material.

The spring 41 may be used for a wide variety of applications. For instance, spring 41 may be used in pogo sticks, diving board apparatuses, truck mounts, shock absorbers, railroad car cushioning units, and generally in any device that uses a spring.

In use, force on the spring 41 causes the spring 41 to compress, and upon application of sufficient force on the spring 41, the spring 41 compresses such that its inner surface 51 and its outer surface 55 move to maintain an annular cylindrical column structure throughout the axial length of the body 43, such that the mid-portion 46 of the body 43 has a substantial portion 46a that is in direct alignment with the first end portion 45 of the body 43 and the second end portion 47 of the body 43. Accordingly, when in a compressed state, the spring 41 has the portion 46a of the mid-portion 46 of the body 43, a cross section on which is indicated generally by the area enclosed by dashed lines 61, that supports in a straight line the portions of the spring 41 directly above and below the portion 46a, thereby eliminating or reducing the chances of the spring 41 failing caused by the spring 41 folding or buckling. In effect, the invention maintains the structure of an annular column of material extending from the first end portion 45 of the spring 41 to the second end portion 47 of the spring 41 to handle the force applied to the spring 41 when the spring 41 is being compressed.

By varying the degree or extent that the inner and outer surfaces 51 and 55 bow in a non-compressed state, the direction of movement of the inner surface 51 and the outer surface 55 (e.g., both surfaces 51 and 55 moving outwardly, or both surfaces 51 and 55 moving inwardly, or the outer surface 55 moving outwardly and the inner surface 51 moving inwardly) when the spring 41 is being compressed may be controlled to obtain a desired overall shape of the spring 41 for its application of use when compressed, such shape having the structure of an annular column of material that supports in a straight line the portions of the spring 41 directly above and directly below the portion 46a.

Figure 15B:
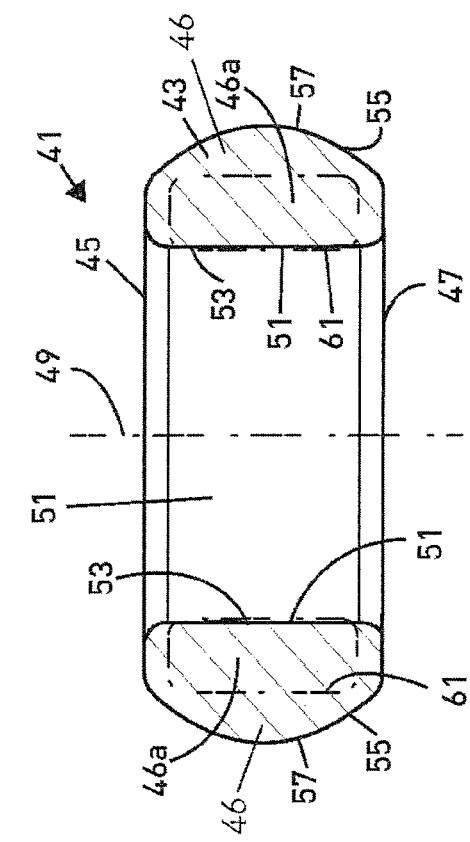
FIG. 15b is a view in cross-section of the inventive polymer spring 41 of FIGS. 11 to 14 in a loaded condition.
Figure 15A:
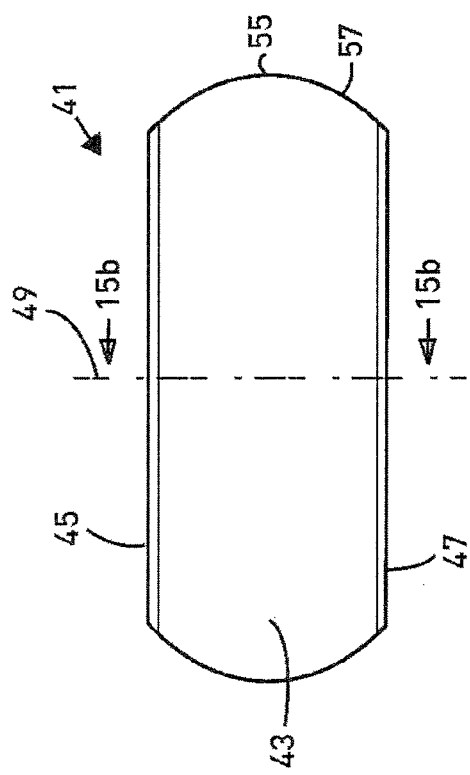
FIG. 15a is a view in front elevation of the inventive polymer spring 41 of FIGS. 11 to 14 in a loaded condition.

For example, referring to FIGS. 11 to 15b, and in particular to FIGS. 14 and 15a and 15b, in the inventive spring 41 shown in this preferred embodiment of the invention, the ratio of the radius of the arc that matches the bow of the outer surface 55 to the radius of the arc that matches the bow of the inner surface 51 is about 2 to 1, which results in both the inner surface 51 and the outer surface 55 moving outwardly away from the center axis 49 as force is applied to the spring 41. Force on the spring 41 causes the spring 41 to compress, and upon application of sufficient force on the spring 41, the spring 41 compresses such that its outer surface 55 begins to bulge outwardly away from the center axis 49 and its inner surface 51 begins to move from being bowed inwardly towards the center axis 49 towards being bowed outwardly away from the center axis 49. As indicated above, preferably, as illustrated in FIG. 15b, when the spring 41 is at a predetermined maximum compression designed for a predetermined use of the spring 41, the inner surface 51 of the body 43 between the first end portion 45 of the body 43 and the second end portion 47 of the body 43 flattens out from its inwardly bowed shape to form a substantially cylindrical wall 53 that faces and extends around the center axis 49, with each portion of the wall 53 being radially spaced substantially the same distance from the center axis 49. Accordingly, when in a compressed state, the spring 41 has an annular portion 46a, a cross-section of which is indicated generally by the area enclosed by dashed lines 61, that supports in a straight line the portions of the spring 41 directly above and below the portion 46a, thereby eliminating or reducing the chances of the spring 41 failing caused by the spring 41 folding or buckling. In effect, the invention maintains the structure of an annular column of material extending from the first end portion 45 of the spring 41 to the second end portion 47 of the spring 41 to handle the force applied to the spring 41 when the spring 41 is being compressed. This embodiment of the spring 41 is of particular advantage when the spring 41 is used in a device in which the inner surface 51 of the spring 41 surrounds a portion of the device and inward expansion of a spring would interfere with the operation of the device.

Figure 17B:
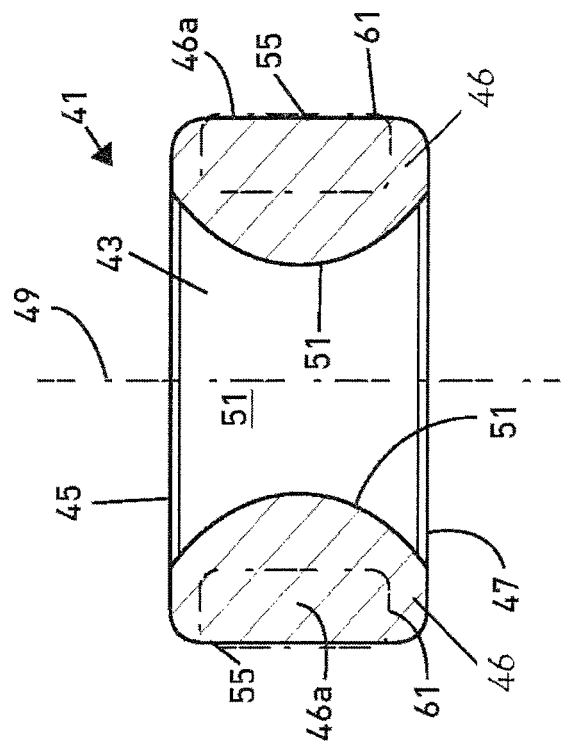
FIG. 17b is a view in cross-section of the inventive polymer spring 41 of FIGS. 16a and 16b shown in a loaded condition.
Figure 17A:
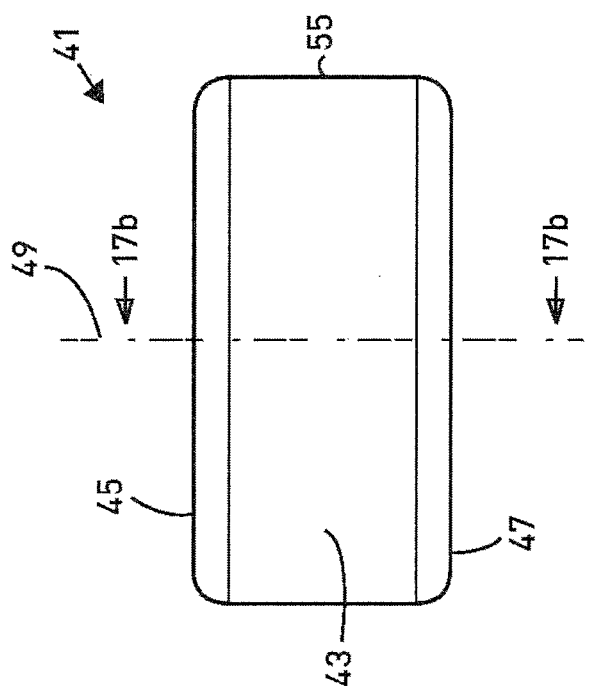
FIG. 17a is a view in front elevation of the inventive polymer spring 41 of FIGS. 16a and 16b shown in a loaded condition.
Figure 18B:
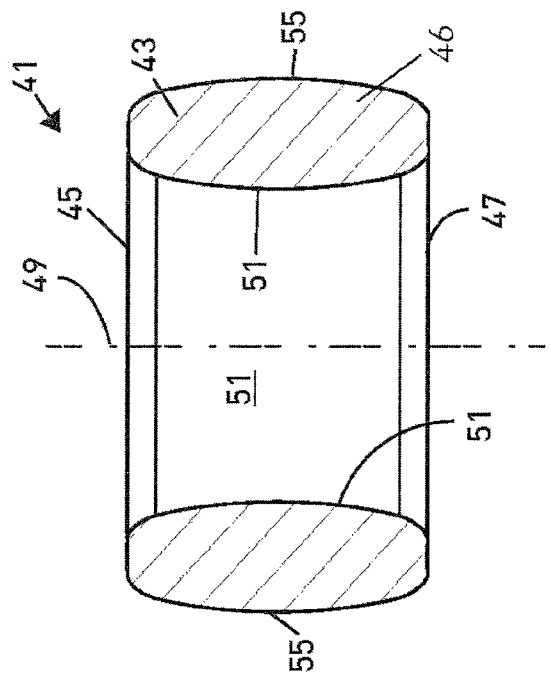
FIG. 18b is a view in cross-section of the inventive polymer spring 41 of FIG. 18a shown in an unloaded condition.
Figure 18A:
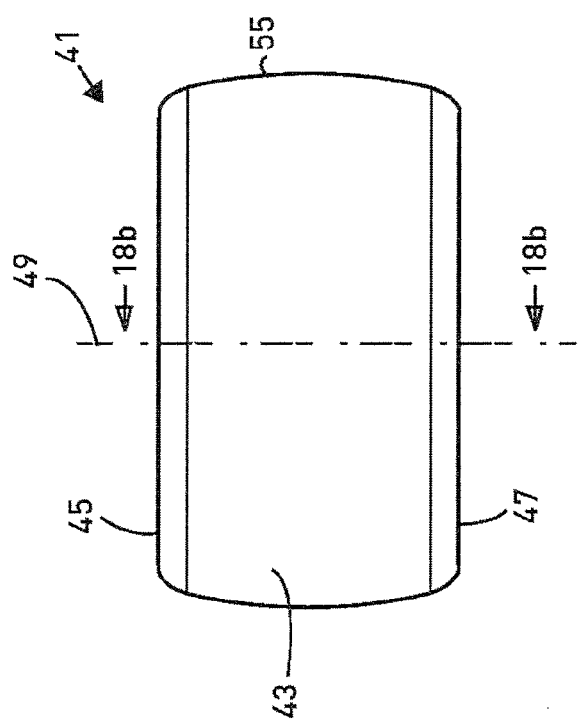
FIG. 18a is a view in front elevation of still another preferred embodiment of the inventive polymer spring 41 shown in an unloaded condition.
Figure 19B:
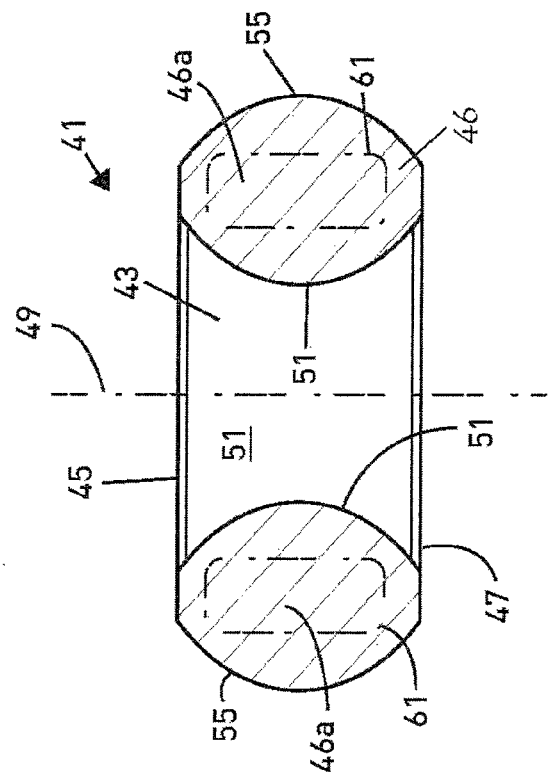
FIG. 19b is a view in cross-section of the inventive polymer spring 41 of FIGS. 18a and 18b shown in a loaded condition.
Figure 19A:
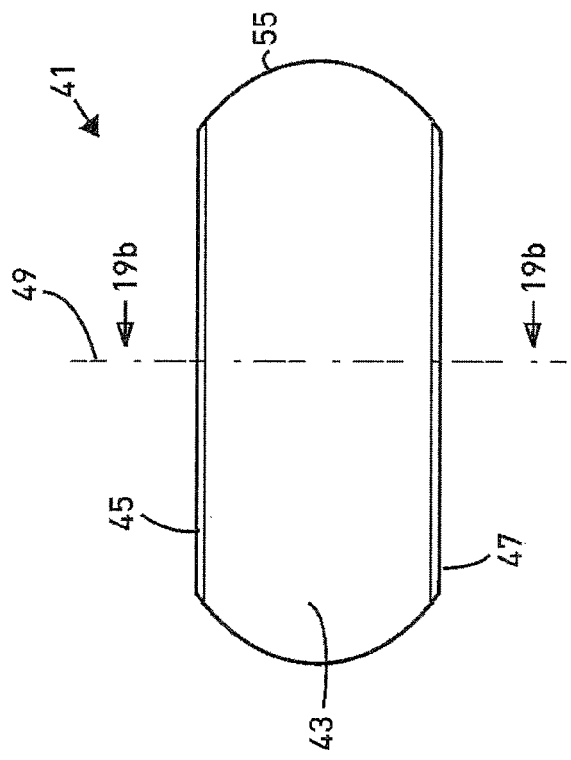
FIG. 19a is a view in front elevation of the inventive spring 41 of FIGS. 18a and 18b shown in a loaded condition.

A further example is shown in FIGS. 16a, 16b, 17a, and 17b. In the inventive spring 41 shown in this preferred embodiment of the invention, the ratio of the radius of the arc that matches the bow of the outer surface 55 to the radius of the arc that matches the bow of the inner surface 51 is about 5 to 1, which results in both the inner surface 51 and the outer surface 55 moving inwardly towards the center axis 49 as force is applied to the spring 41. Accordingly, when in a compressed state, the spring 41 has an annular portion 46a, a cross-section of which is indicated generally by the area enclosed by dashed lines 61, that supports in a straight line the portions of the spring 41 directly above and below the portion 46a, thereby eliminating or reducing the chances of the spring 41 failing caused by the spring 41 folding or buckling. In effect, the invention maintains the structure of an annular column of material extending from the first end portion 45 of the spring 41 to the second end portion 47 of the spring 41 to handle the force applied to the spring 41 when the spring 41 is being compressed. This embodiment of the spring 41 is of particular advantage when the spring 41 is used in a device in which the spring 41 is surrounded by a portion of the device and outward expansion of a spring would interfere with the operation of the device. Another advantage of this embodiment of the invention is that the strength of the spring 41 is fortified during compression as the inner surface 51 at the mid-portion 46 moves into itself, as shown in FIG. 17b.

A still further example is shown in FIGS. 18a, 18b, 19a, and 19b. In the inventive spring 41 shown in this preferred embodiment of the invention, the ratio of the radius of the arc that matches the bow of the outer surface 55 to the radius of the arc that matches the bow of the inner surface 51 is about 1 to 1, which, as compression on the spring 41 increases, results in the inner surface 51 moving from being bowed inwardly towards the center axis 49 to being further bowed inwardly towards the center axis 49, and in the outer surface 55 moving from being bowed outwardly away from the center axis 49 to being further bowed outwardly away from the center axis 49. Accordingly, when in a compressed state, the spring 41 has an annular portion 46a, a cross-section of which is indicated generally by the area enclosed by dashed lines 61, that supports in a straight line the portions of the spring 41 directly above and below the portion 46a, thereby eliminating or reducing the chances of the spring 41 failing caused by the spring 41 folding or buckling. In effect, the invention maintains the structure of an annular column of material extending from the first end portion 45 of the spring 41 to the second end portion 47 of the spring 41 to handle the force applied to the spring 41 when the spring 41 is being compressed. In this example, the mid-section 46 when the spring 41 is in a compressed state resembles the shape of a donut.

In contrast to the spring 41 of the invention, the straight cylinder spring 11, when in a compressed state shown in FIG. 3c, has nothing in the direct line between portion 14 and portion 16 but empty space 18. Without anything on a straight line between portions 14 and 16 to support portions 14 and 16 when spring 11 is being compressed, spring 11 is susceptible to folding or buckling, as shown in FIG. 4.

Likewise, in contrast to the inventive spring 41, the pre-bulged spring 21 has nothing in the direct line between portion 24 and portion 26 but empty space 28, as shown in FIG. 5c. Without anything on a straight line between portions 24 and 26 to support portions 24 and 26 when spring 21 is being compressed, the spring 21 is susceptible to folding or buckling, as shown in FIGS. 6a, 6b, and 6c.

Figure 9B:
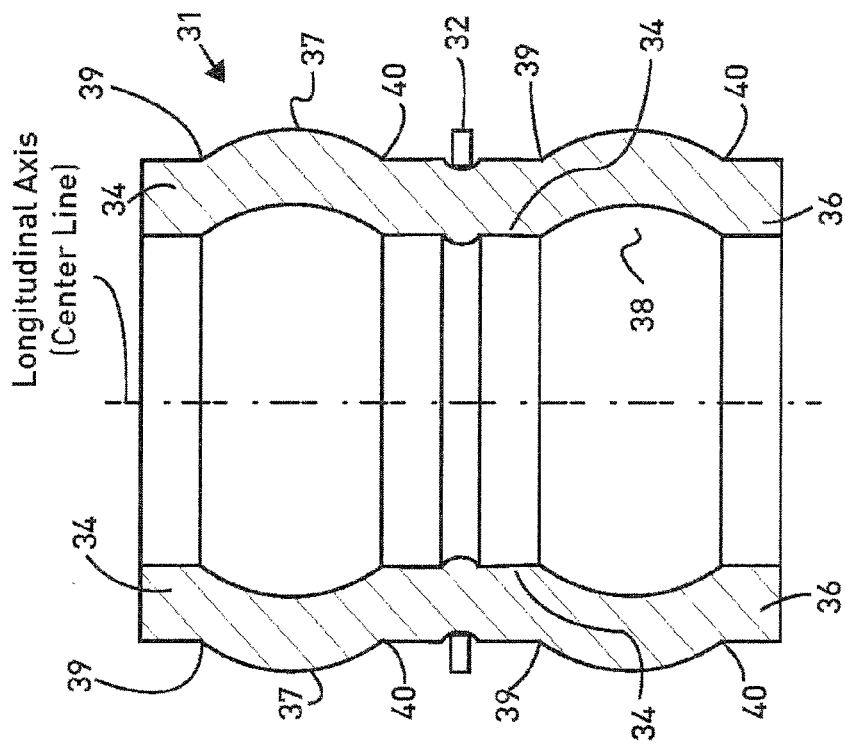
FIG. 9b is a view in cross-section of the constrained polymer spring 31 of FIGS. 7a, 7b, and 8 after the central portions 37 of the spring 31 have bulged outwardly upon application of sufficient force on the spring 31.
Figure 9A:
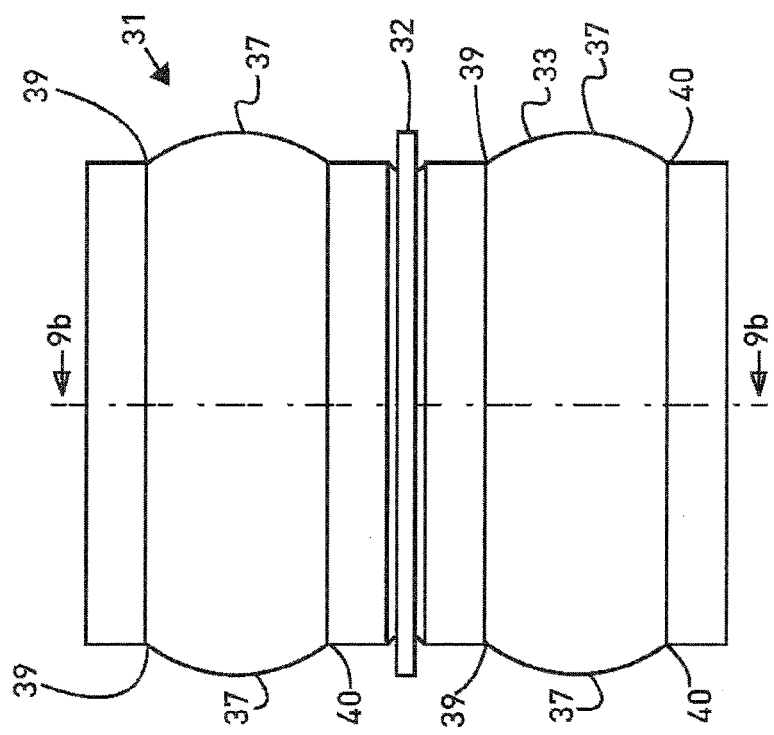
FIG. 9a is a view in front elevation of the constrained polymer spring 31 of FIGS. 7a, 7b, and 8 after the central portions 37 of the spring 31 have bulged outwardly upon application of sufficient force on the spring 31.

Similarly, in contrast to the inventive spring 41, the constrained spring 31, when in a compressed state shown in FIGS. 9a and 9b, has nothing in the direct line between portion 34 and portion 36 but empty space 38. Without anything on a straight line between portions 34 and 36 to support portions 34 and 36 when spring 31 is being compressed, spring 31 is susceptible to folding or buckling, as shown in FIGS. 10a and 10b.

Figure 20:
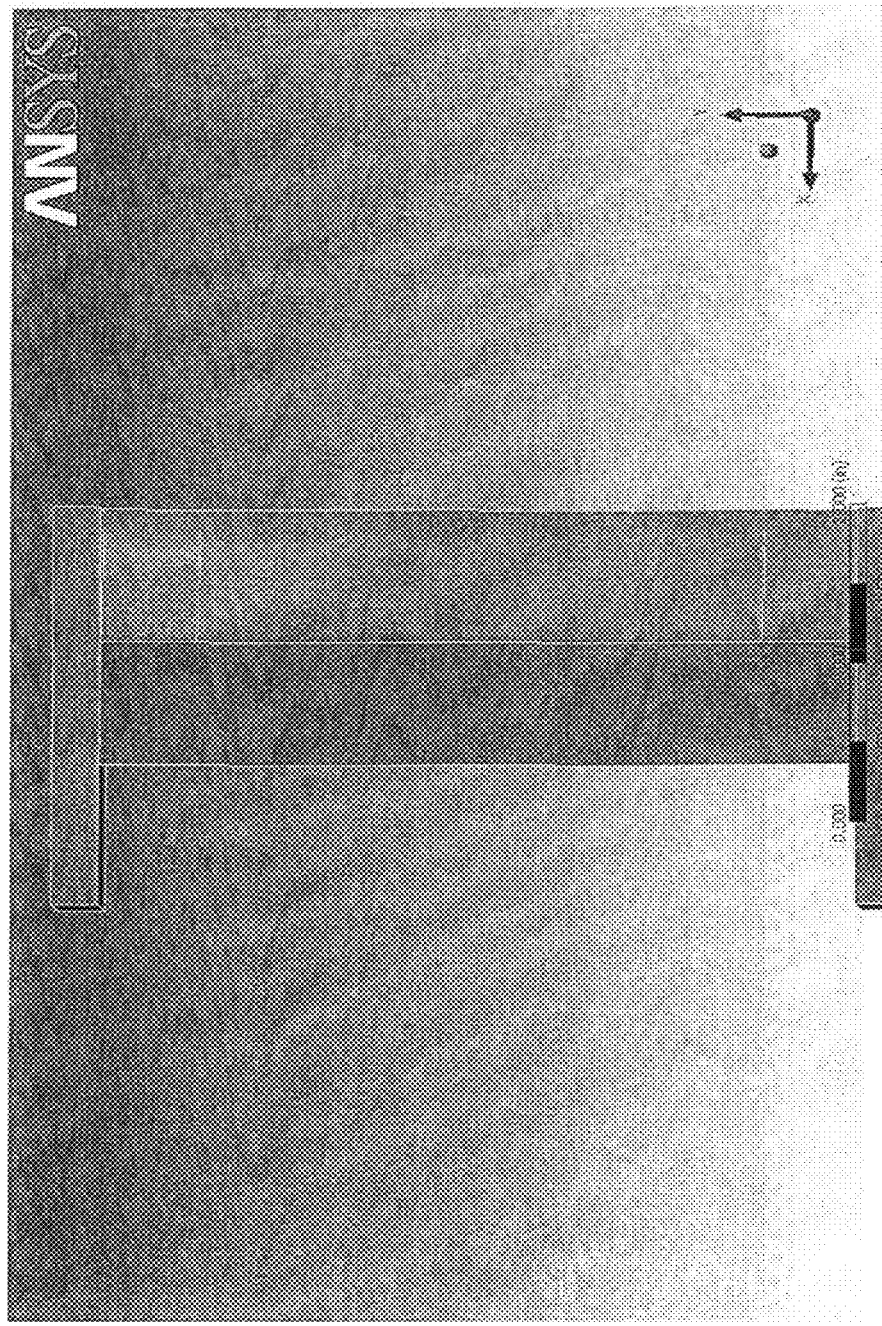
FIGS. 20-28 together provide a comparison of prior art springs and the inventive springs 41 using Finite Element Analysis (FEA) using ANSYS software.
Figure 21:
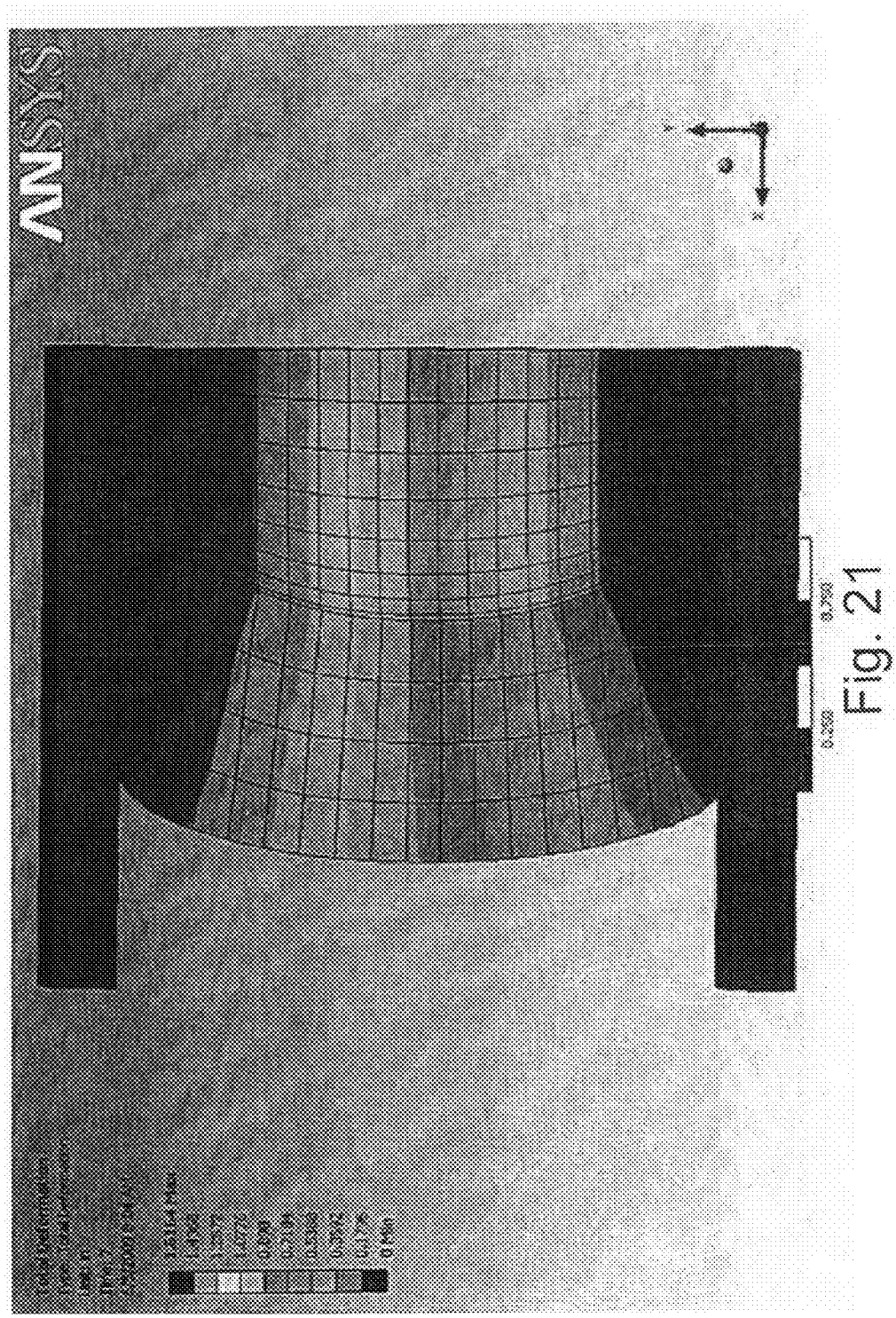

FIGS. 20 to 28 provide a comparison between the spring 41 of the invention and prior art springs using Finite Element Analysis (FEA) using ANSYS software. FIG. 20 shows the spring geometry of a prior art straight cylinder polymer spring 11 in an unloaded condition, and FIG. 21 shows the spring 11 of FIG. 20 in a loaded condition. As may be seen by comparing the images of FIGS. 20 and 21, the inner surface of the spring 11 has moved from being a straight cylinder to being bowed outwardly, which with sufficient force placed on the spring 11 may lead to failure of the spring 11 caused by buckling or folding of the spring 11.

Figure 22:
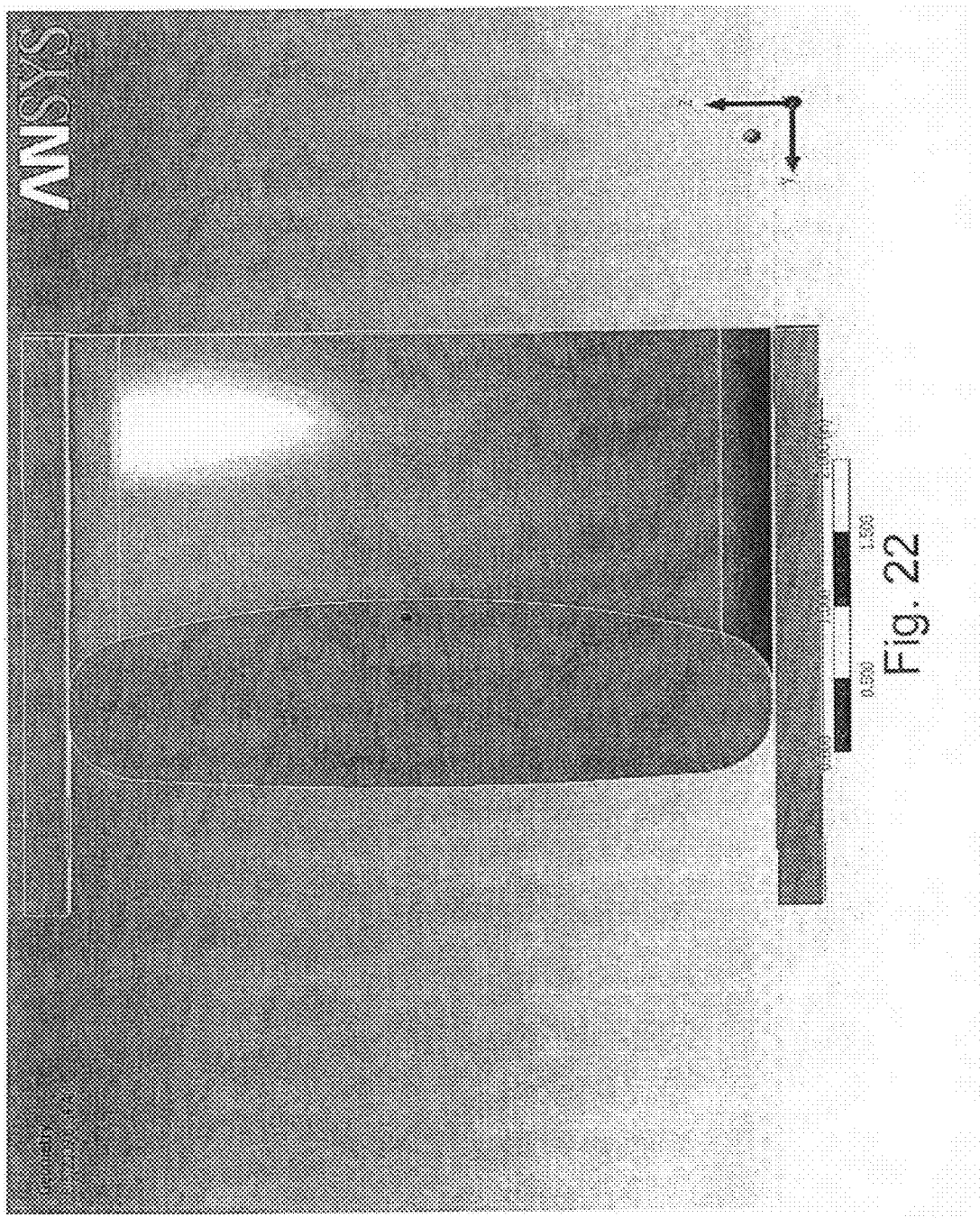
Figure 23:
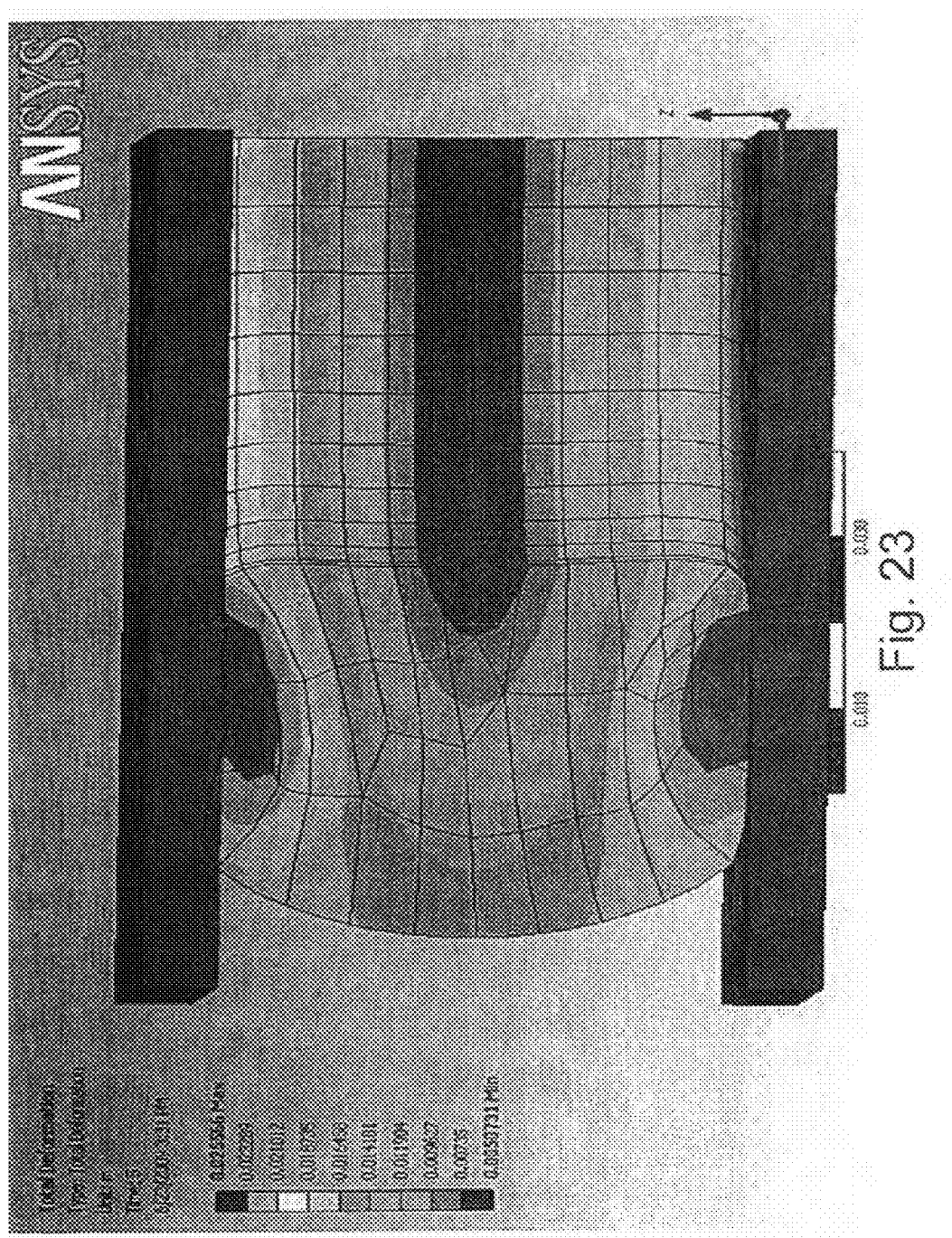

In contrast to the image shown in FIGS. 20 and 21, FIG. 22 shows the spring geometry of a preferred embodiment of the inventive spring 41 in an unload condition, and FIG. 23 shows the spring geometry of the spring 41 of FIG. 22 in a loaded condition. As may be seen by comparing the images of FIGS. 22 and 23, the inner surface of the spring 41 had moved from being bowed inwardly to being substantially flattened out when the spring 41 is viewed in cross-section, forming a substantially cylindrical wall that faces and extends around the center axis of the spring 41, with each portion of the wall being radially spaced substantially the same distance from the center axis. Accordingly, rather than being left with nothing directly in line with the portions of the spring 41 next to the bulged portion of the spring 41 to support such portions of the spring 41 when the spring 41 has been sufficiently compressed (e.g., loaded), the portions of the spring 41 next to the bulged portion of the spring 41 are supported by the portion of the spring 41 located therebetween which is positioned directly in line with the portions of the spring 41 next to the bulged portion of the spring 41, which results in eliminating or significantly reducing the chances of the spring 41 failing by buckling or folding.

Figure 24:
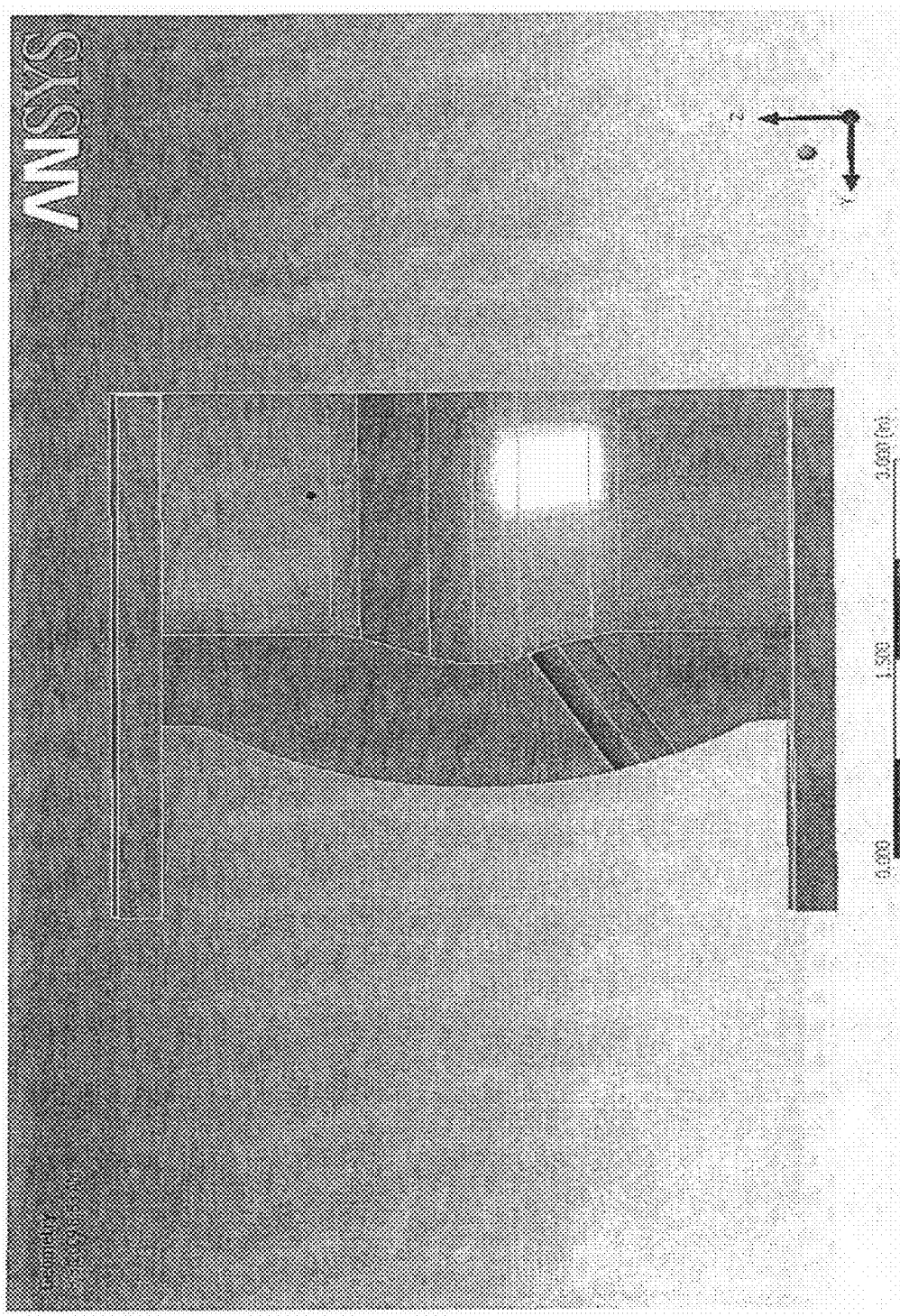
Figure 25:
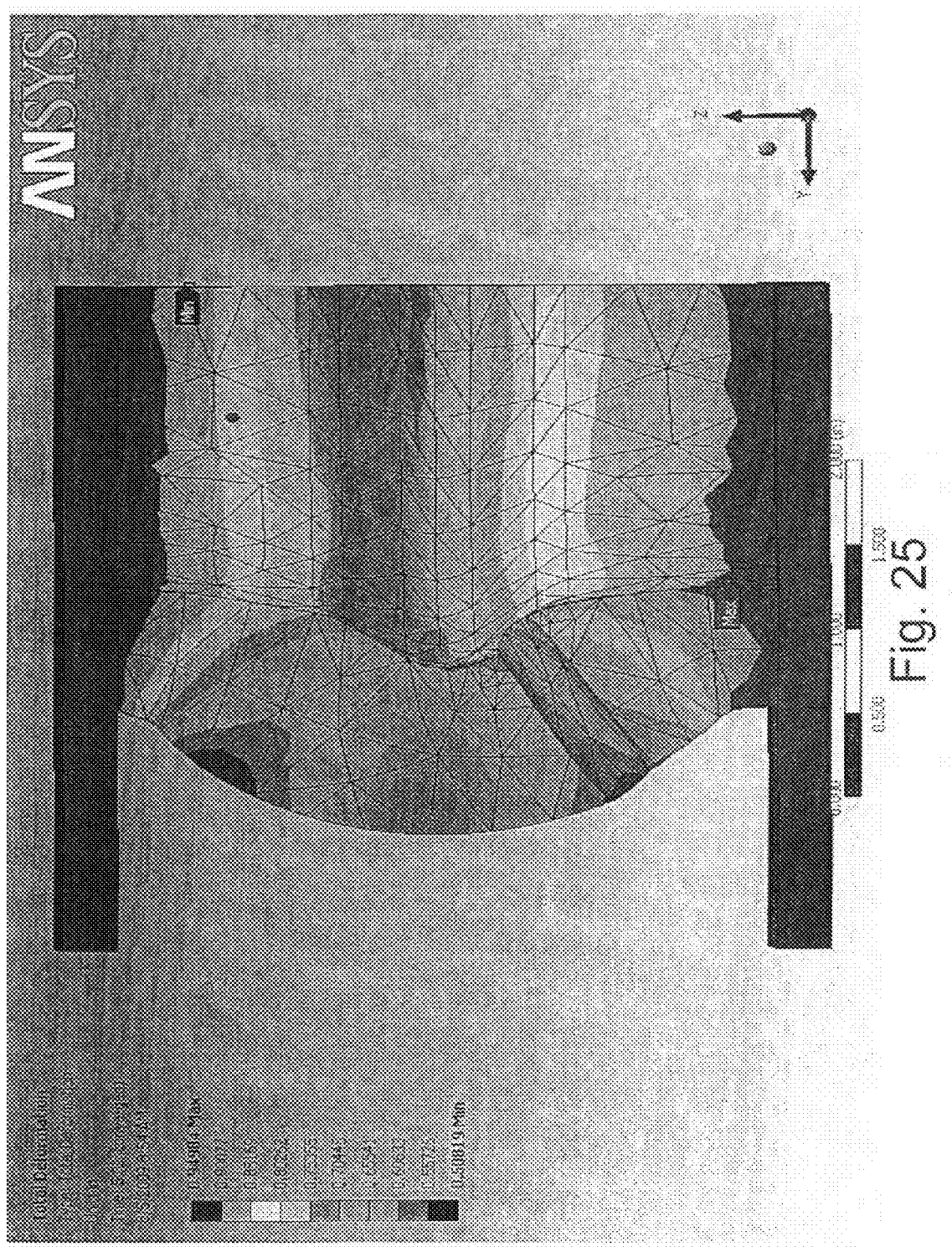
Figure 26:
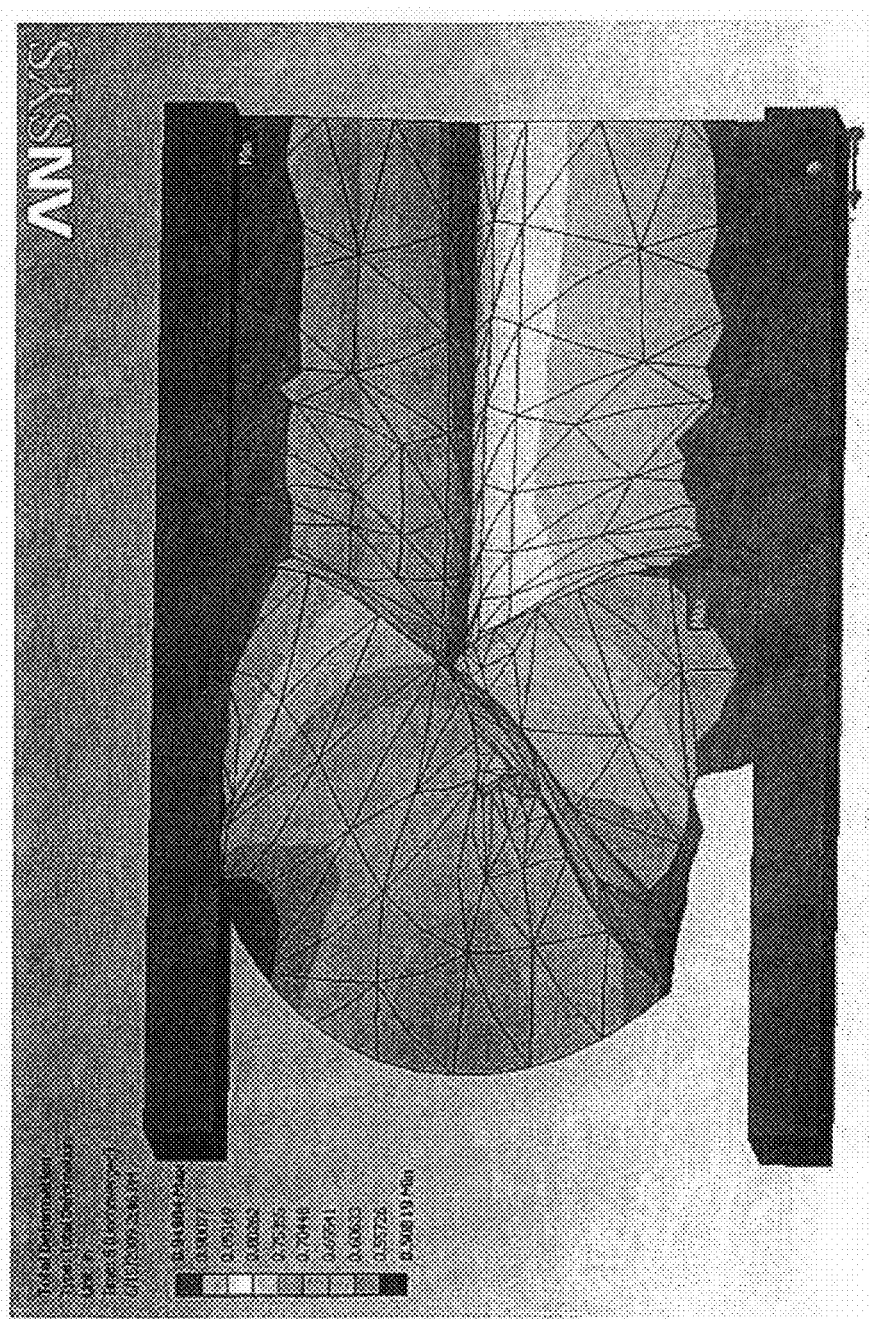

FIG. 24 shows the spring geometry of a prior art pre-bulged polymer spring 21 in an unloaded condition, FIG. 25 shows the spring 20 of FIG. 13 in a loaded condition, and FIG. 26 shows the spring 21 of FIGS. 24 and 25 in a loaded condition where the spring 21 has buckled or folded. As may be seen by comparing the images of FIGS. 24 to 26, the inner surface of the spring 21 has moved from its original pre-bulged position (FIG. 24) to being further bulged outwardly (FIG. 25) beyond its original position, to being buckled or folded (FIG. 26).

Figure 27:
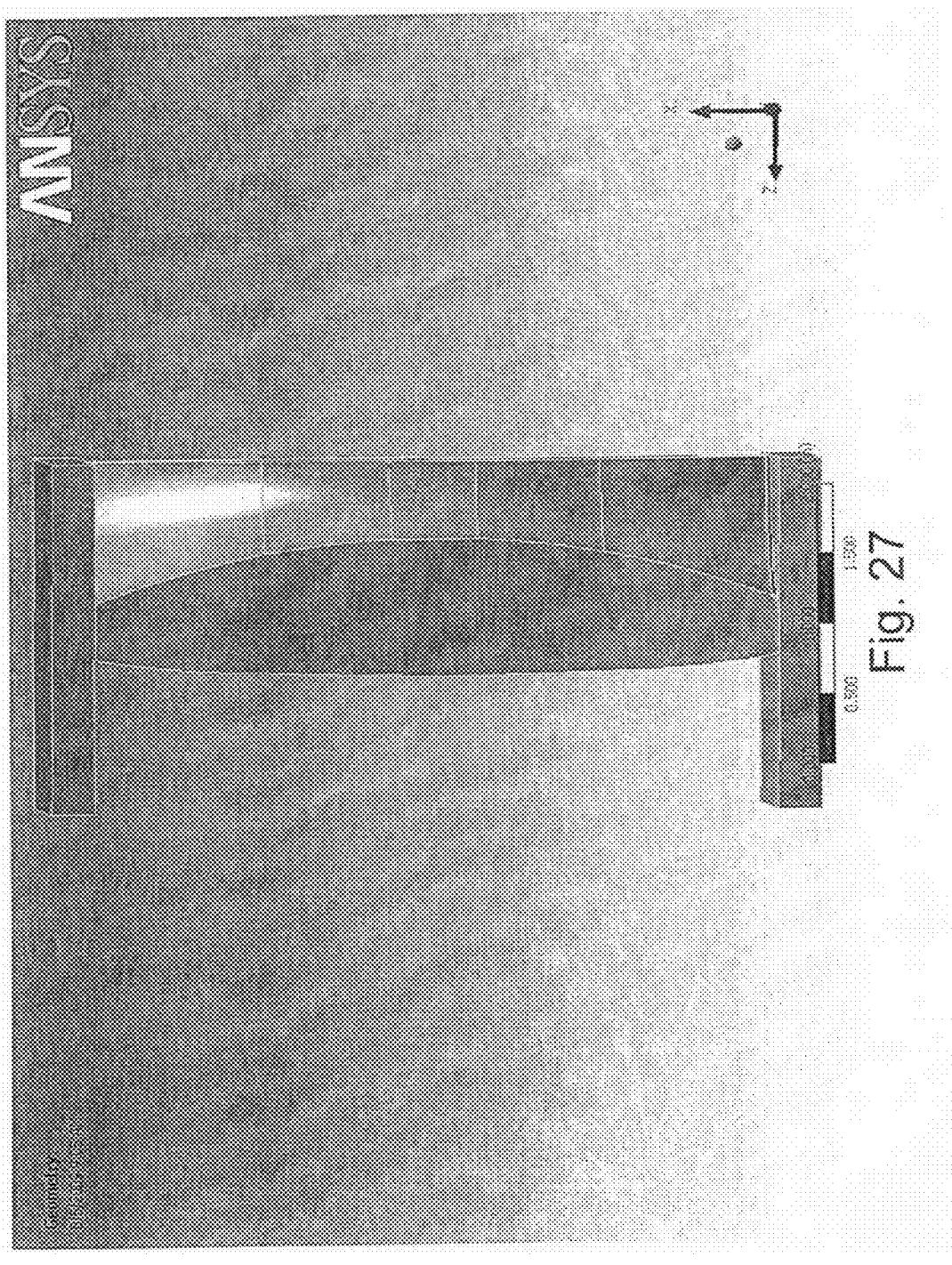
Figure 28:
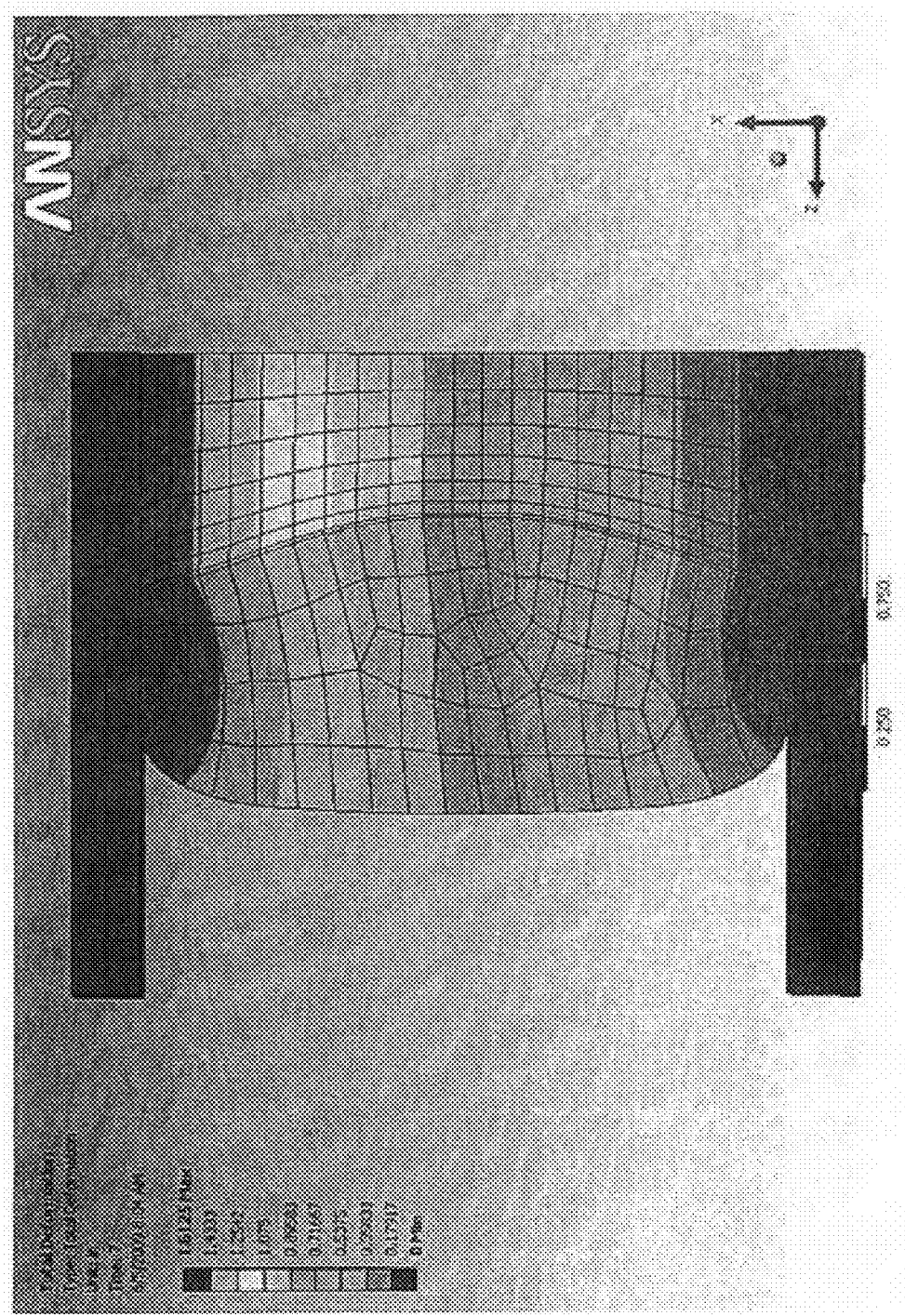

In contrast to the images shown in FIGS. 24 to 26, FIG. 27 shows the spring geometry of another preferred embodiment of the inventive spring 41 in an unloaded condition, and FIG. 28 shows the spring geometry of the spring 41 of FIG. 27 in a loaded condition. As may be seen by comparing the images of FIGS. 27 and 28, the inner surface of the spring 41 has moved from being bowed inwardly to starting to flatten out (when the spring 41 is viewed in cross-section) to start to form a substantial cylindrical wall structure that faces and extends around the center axis of the spring 41, with each portion of the wall structure starting to be radially spaced about the same distance from the center axis. Accordingly, rather than being left with nothing directly in line with the portions of the spring 41 next to the bulged portion of the spring 41 to support such portions of the spring 41 when the spring 41 has been sufficiently compressed (e.g., loaded), the portions of the spring 41 next to the bulged portion of the spring 41 are supported by the portion of the spring 41 located therebetween which is positioned directly in line with the portions of the spring 41 next to the bulged portion of the spring 41, which results in eliminating or significantly reducing the chances of the spring 41 failing by buckling or folding.

What is claimed is:

1. A spring, comprising
a hollow tubular polymer body,
the body having a first end portion, a second end portion, a mid-portion connecting the first end portion to the second end portion, a center axis extending between the first end portion of the body and the second end portion of the body, an inner surface extending around and facing the center axis between the first end portion of the body and the second end portion of the body, and an outer surface extending around the center axis between the first end portion of the body and the second end portion of the body,
the body having a length from the first end portion to the second end portion,
the inner surface of the body between the first end portion of the body and the second end portion of the body being bowed inwardly towards the center axis when the spring is in a non-compressed state,
the outer surface of the body between the first end portion of the body and the second end portion of the body being bowed outwardly away from the center axis when the spring is in a non-compressed state,
the inner surface of the body between the first end portion of the body and the second end portion of the body moving from being bowed inwardly towards the center axis to being further bowed inwardly towards the center axis as compression on the spring increases, and
the outer surface of the body between the first end portion of the body and the second end portion of the body moving from being bowed outwardly away from the center axis towards being bowed inwardly towards the center axis as compression on the spring increases;
the inner surface of the body between the first end portion of the body and the second end portion of the body forming a substantially cylindrical wall facing and extending around the center axis, with each portion of the wall being radially spaced substantially the same distance from the center axis when the spring is at a predetermined maximum compression designed for a predetermined use of the spring.

2. The spring of claim 1, the polymer body being comprised of an elastomeric material.

3. The spring of claim 1, the polymer body being comprised of rubber, urethane, epoxy, silicone, nylon, co-polyester elastomer, PEEK, or thermoplastic elastomer.

4. The spring of claim 1, wherein the outward bow of the outer surface of the body between the first end portion of the body and the second end portion of the body, when the spring is in a non-compressed state is substantially greater than the bow of the inner surface when the spring is in a non-compressed state.

5. The spring of claim 1, wherein the radius of the arc that matches the bow of the outer surface to the radius of the arc that matches the bow of the inner surface is about 5:1.

6. A spring, comprising
a hollow tubular polymer body,
the body having a first end portion, a second end portion, a mid-portion connecting the first end portion to the second end portion, a center axis extending between the first end portion of the body and the second end portion of the body, an inner surface extending around and facing the center axis between the first end portion of the body and the second end portion of the body, and an outer surface extending around the center axis between the first end portion of the body and the second end portion of the body,
the body having a length from the first end portion to the second end portion,
the inner surface of the body between the first end portion of the body and the second end portion of the body being bowed inwardly towards the center axis when the spring is in a non-compressed state,
the outer surface of the body between the first end portion of the body and the second end portion of the body being bowed outwardly away from the center axis when the spring is in a non-compressed state, and
the inner surface of the body between the first end portion of the body and the second end portion of the body moving from being bowed inwardly towards the center axis to being further bowed inwardly towards the center axis as compression on the spring increases,
the first end portion of the body, the second end portion of the body, and the mid-portion of the body together substantially maintaining an annular cylindrical column structure throughout the length of the body from the first end portion of the body to the second end portion of the body, such that the mid-portion of the body has a substantial portion that is in direct alignment with the first end portion of the body and the second end portion of the body when the spring is compressed until at least a predetermined maximum compression designed for a predetermined use of the spring is reached.

7. The spring of claim 6,
the outer surface of the body between the first end portion of the body and the second end portion of the body moving from being bowed outwardly away from the center axis towards being bowed inwardly towards the center axis as compression on the spring increases;
wherein the radius of the arc that matches the bow of the outer surface to the radius of the arc that matches the bow of the inner surface is about 5:1.

8. The spring of claim 7, the polymer body being comprised of an elastomeric material.

9. The spring of claim 7, the polymer body being comprised of rubber, urethane, epoxy, silicone, nylon, co-polyester elastomer, PEEK, or thermoplastic elastomer.

10. The spring of claim 6,
the polymer body being comprised of an elastomeric material.

11. The spring of claim 6,
the polymer body being comprised of rubber, urethane, epoxy, silicone, nylon, co-polyester elastomer, PEEK, or thermoplastic elastomer.

12. The spring of claim 6,
the outer surface of the body between the first end portion of the body and the second end portion of the body being bowed at least slightly outwardly away from the center axis when the spring is in a non-compressed state to start the portion of the body located between the first end portion of the body and the second end portion of the body to bulge outwardly away from the center axis as force is applied to the spring or to keep the outer surface of the body between the first end portion of the body and the second end portion of the body from moving inwardly towards the center axis as force is applied to the spring.

13. The spring of claim 12,
the outer surface of the body being less bowed than the inner surface of the body.

14. The spring of claim 12,
the inner surface of the body between the first end portion of the body and the second end portion of the body forming a substantially cylindrical wall facing and extending around the center axis, with each portion of the wall being radially spaced substantially the same distance from the center axis when the spring is at a predetermined maximum compression designed for a predetermined use of the spring.

15. The spring of claim 6,
the inner surface of the body between the first end portion of the body and the second end portion of the body forming a substantially cylindrical wall facing and extending around the center axis, with each portion of the wall being radially spaced substantially the same distance from the center axis when the spring is at a predetermined maximum compression designed for a predetermined use of the spring.

16. The spring of claim 6,
the polymer body being comprised of an elastomeric material, and wherein at a minimum radius measured from the center axis, has a taper of the inner surface extending in both directions, including a first direction between the minimum radius inner surface location and the first end portion, and a second opposite direction between the minimum radius inner surface location and the second end portion.

17. The spring of claim 6,
the polymer body being comprised of rubber, urethane, epoxy, silicone, nylon, co-polyester elastomer, PEEK, or thermoplastic elastomer.

18. The spring of claim 6, wherein the outer surface of the body between the first end portion of the body and the second end portion of the body moving from being bowed outwardly away from the center axis to being further bowed outwardly away from the center axis as compression on the spring increases.

19. The spring of claim 18, the body having means for guarding against failure of the spring due to buckling or folding of the body by causing the body of the spring to substantially maintain an annular cylindrical column structure throughout the length of the body from the first end portion of the body to the second end portion of the body, such that the mid-portion of the body has a substantial portion that is in direct alignment with the first end portion of the body and the second end portion of the body when the spring is compressed until at least a predetermined maximum compression designed or a predetermined use of the spring is reached.

20. The spring of claim 6, the outer surface of the body between the first end portion of the body and the second end portion of the body moving from being bowed outwardly away from the center axis towards being bowed inwardly towards the center axis as compression on the spring increases; and wherein the radius of the arc that matches the bow of the outer surface is substantially greater than the radius of the arc that matches the bow of the inner surface.

\* \* \* \* \*